United States Patent [19]
Burger et al.

[11] Patent Number: 5,134,264
[45] Date of Patent: Jul. 28, 1992

[54] DEVICE FOR THE INDUCTIVE HEATING OF THE INSIDE OF CYLINDER LINERS OF RECIPROCATING-PISTON ENGINES FOR THE PURPOSE OF HARDENING

[75] Inventors: Dieter Burger, Vaihingen; Walter Burböck, Stuttgart; Peter Linden, Wernau, all of Fed. Rep. of Germany

[73] Assignee: Mercedes-Benz AG, Fed. Rep. of Germany

[21] Appl. No.: 691,434

[22] Filed: Apr. 25, 1991

[30] Foreign Application Priority Data

Apr. 25, 1990 [DE] Fed. Rep. of Germany ....... 4013148

[51] Int. Cl.$^5$ .............................................. H05B 6/64
[52] U.S. Cl. ................... 219/10.57; 219/6.5; 219/10.43; 219/10.59; 219/10.73; 219/10.79; 266/123; 266/125; 266/129
[58] Field of Search ............. 219/10.57, 10.43, 10.491, 219/10.79, 10.41, 10.77, 10.59, 10.67, 10.69, 10.71, 6.5, 10.73; 266/129, 249, 123, 125, 134

[56] References Cited

U.S. PATENT DOCUMENTS

| | | | |
|---|---|---|---|
| 2,397,629 | 4/1946 | Stevens | 219/10.43 |
| 2,756,985 | 7/1956 | Radtke | 266/123 |
| 2,757,267 | 7/1956 | Brauer | 219/10.73 |
| 2,810,053 | 10/1957 | Messner | 219/10.51 |
| 3,674,247 | 7/1972 | Gillick | 266/4 E |
| 4,401,485 | 8/1983 | Novorsky | 148/150 |
| 4,625,090 | 11/1986 | Pfaffmann | 219/10.57 |
| 4,628,167 | 12/1986 | West | 219/10.57 |
| 4,849,594 | 7/1989 | Balzer | 219/10.43 |

FOREIGN PATENT DOCUMENTS 1046215 12/1958 Fed. Rep. of Germany .
717620 10/1954 United Kingdom .

Primary Examiner—Bruce A. Reynolds
Assistant Examiner—Tu Hoang
Attorney, Agent, or Firm—Evenson, Wands, Edwards, Lenahan & McKeown

[57] ABSTRACT

A device for induction heating of the inside of cylinder liners of reciprocating-piston engines to a transformation temperature, for the purpose of hardening. An inductor head is equipper with an aligning device designed as a spreadable cage which is equipped on the outside with clamping bars, clamping bosses a clamping shells which can be applied free from play and under the effect of force against the inner surface of the cylinder liner. The inductor loop is also displaced radially and brought into the working position by means of these clamping shells. Heating and hardening is carried out only with the inductor head in the clamped and exactly aligned state, whereas, after the clamping shells and the inductor loops have been released, a further indexed movement of the inductor head is possible. The work is carried out at relatively high alternating-current frequencies in the range between 400 and 500 kHz and at relatively high energy densities in the range above 5 kw/cm$^2$ .

16 Claims, 2 Drawing Sheets

DEVICE FOR THE INDUCTIVE HEATING OF THE INSIDE OF CYLINDER LINERS OF RECIPROCATING-PISTON ENGINES FOR THE PURPOSE OF HARDENING

BACKGROUND AND SUMMARY OF THE INVENTION

The invention relates to a device for the induction heating of the inside of cylinder liners of reciprocating-piston engines for the purpose of hardening, as disclosed, for example, from G.B. patent specification No. 717,620.

The known hardening device has an inductor head insertable axially into the cylinder liner, with an axially aligned inductor loop and with a spray head directly adjacent in the circumferential direction. The inductor head is centered with play within the cylinder liner by means of bars arranged in a spoke-like manner. For hardening, the cylinder liner is rotated slowly past the fixedly located and immovably held inductor head the inductor loop and the quenching spray, so that a hardened strip, continuous in the circumferential direction, forms on the inner surface of the cylinder liner.

A disadvantage of the known hardening device is that, as a result of the necessary play between the centering bars for the inductor head and the inner surface of the cylinder liner, the position of the inductor loop relative to the inner surface is indeterminate to the extent of this play, and the inductive coupling of the cylinder wall to the inductor loop varies correspondingly. Such variation can be compensated only if, during the hardening operation, the working parameters are selected in such a way that it is unimportant. However, only very great hardening depth can be obtained in this way, which in turn leads to relatively pronounced hardening distortions that subsequently have to be ground out again in a way involving a high outlay which is uneconomical. In some circumstances, a great hardening depth can also result in surface melting and subsequent cracking. Consequently, to the applicant's knowledge, it has not hitherto been possible for the induction hardening of cylinder liners to gain acceptance in series production.

The object of the present invention is to develop the generic device such that hardening is accomplished with only low distortion, and in a manner that is practicable in engine operation; any residual distortions must be so slight that they can be ground out without appreciable extra outlay by conventional honing which can be carried out under series production conditions.

This and other objects and advantages achieved by the induction heating device according to the invention, in which the inductor head is fixedly clamped within the cylinder liner, and the heating is executed only at a relative standstill. This technique ensures every time, during heating, an exactly defined play-free relative position of the inductor loop and inner surface, so that the work can be carried out with finely adjusted working parameters. It is thereby possible to select the parameters so that the hardening depth is restricted to a thin boundary layer which, on the one hand, remains distortion-free (or at least of very low distortion) and on the other hand can do without extraneous quenching, since the non-heated basic material lying underneath it can itself quench the heated boundary layer through heat dissipation. Because extraneous quenching is unnecessary the inductor head remains very clean, and can correspondingly be positioned very exactly.

For the complete hardening of a cylinder liner, only individual hard strips are laid in place, which have a spacing in the circumferential direction and are separated from one another by non-hardened intermediate strips. These individual strips are applied successively in stages or steps. As a result of the thin boundary-layer hardening and because the hardness zone applied is broken down into strips, the distortions occurring during hardening are negligible, or at least so slight that they can be ground out again by honing, at a quite justifiable outlay. Also, the hardness zone being broken down into strips affords a load-bearing capacity sufficiently high in engine operation. The strips can remain restricted to the region which the piston rings of the reciprocating piston occupy in the region of the top dead-center.

Other objects, advantages and novel features of the present invention will become apparent from the following detailed description of the invention when considered in conjunction with the accompanying drawings.

DETAILED DESCRIPTION OF THE DRAWINGS

Figure 3:
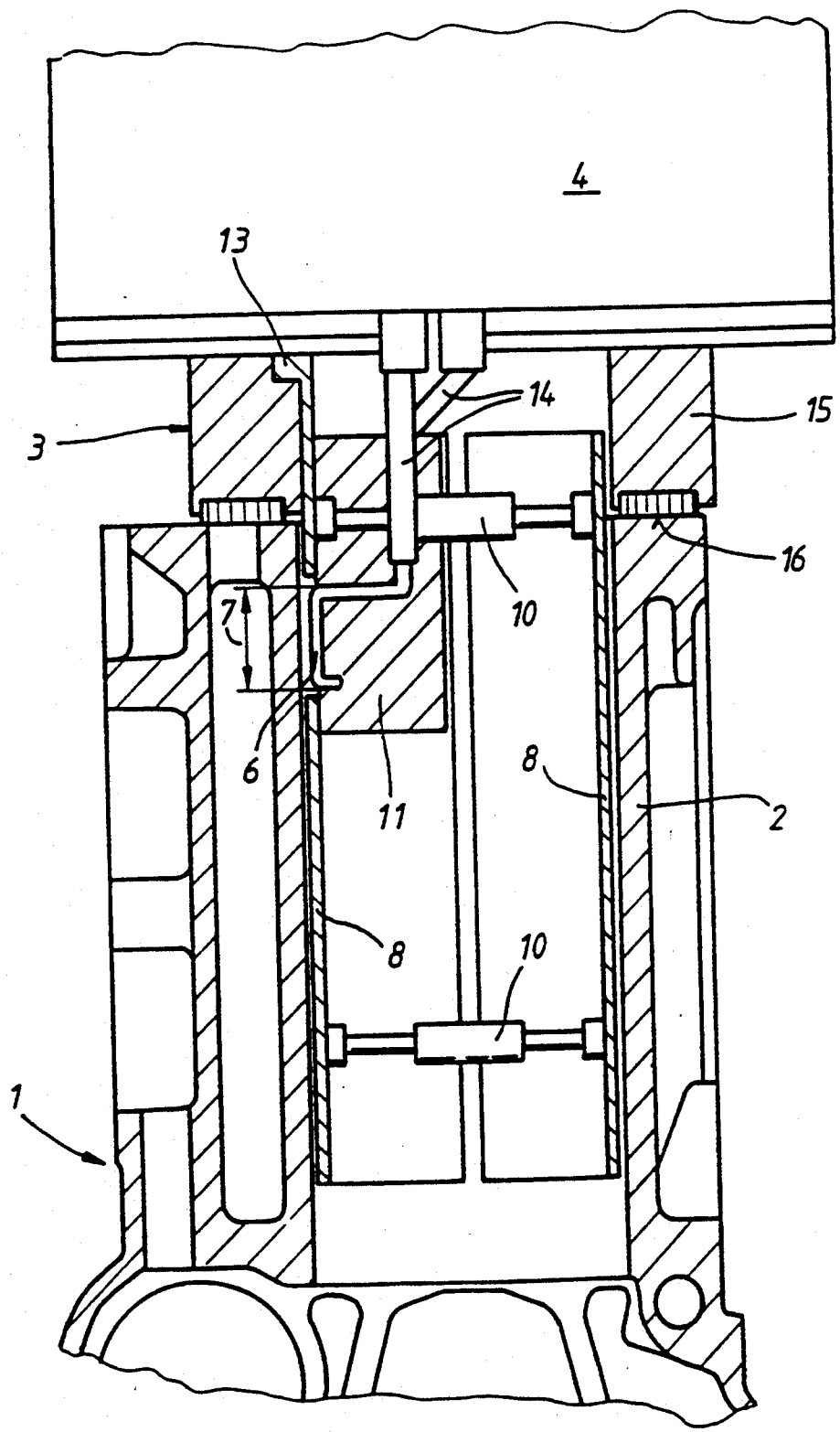
FIG. 3 shows a section through an engine block, with the inductor head according to FIGS. 1 and 2 inserted into a cylinder liner.

The device shown only partially in the Figures serves for the inductive heating of the inside of cylinder liners 2 of reciprocating-piston engines to transformation temperature for the purpose of hardening. Of the reciprocating-piston engine, FIG. 3 shows only the engine block 1. In it, the cylinder liner 2 is a monolithic integral part of the engine block 1. There are also other known instances in which the cylinder liner is installed releasably in the engine block or is pressed into it as a separate liner.

An essential component of the hardening device is the inductor head 3 which can be introduced into the cylinder liner 2 by a machine (not shown), for example a manipulator, which guides the circumferential positioning and further rotation of the inductor head and, after completion of the operation of hardening a cylinder liner, guides the change-over of the inductor head into the next-following cylinder liner. It is also conceivable, however, for some of the movements, for example a relative displacement of the engine block and its handling, to be shifted together with the engine block, as also shown, for example, in the literature reference mentioned in the introduction. Especially in the case of individual cylinder liners which are inserted into an engine block only at a later stage, it seems quite evidently to be expedient for many of the relative movements also to take place by the cylinder liner.

In conjunction with the operation the inductor head 3, a high power generator which generates a high-frequency voltage by the use of semiconductor elements or tubes is required. In the present application, frequencies in the range of above 100 kHz, specifically especially 400 to 500 kHz, are of interest. Because of the high frequencies, an inductive coupling of the marginal layers particularly is especially effective, and high power densities can be transmitted. The high-frequency voltage generated by the high-frequency generator is converted to a lower voltage and correspondingly higher current by means of a transformer 4 mounted near the inductor. Mounted firmly underneath the transformer 4 is the already mentioned inductor head 3. The transformer 4 must therefore also execute all the movements of the inductor head 3.

The inductor head contains at least one inductor loop 5 in the form of an electrical conductor 6 which extends over the entire axial region 7 of the zone to be hardened, but which in the circumferential direction extends over only a small fraction of the region to be hardened. In the working position of the inductor loop 5, the conductor 6 is disposed over its entire length at a uniform distance from the inner surface of the cylinder liner 2. This working distance is approximately 0.3 to 0.7 mm, depending on the particular use and on the desired hardening parameters. The working distance should be maintained at least with an accuracy of ±5/100 mm, so that uniform hardening results can be reproduced from one workpiece to another.

To guarantee high accuracy of the working position of the inductor loop 5, according to the invention the inductor head 3, with its aligning device matched to the size of the cylinder liner 2, is designed in a special way. This aligning device serves for the mechanical alignment of the inductor head 3 of the inductor loop 5 into a defined radial position relative to the inner surface of the cylinder liner 2. The aligning device is made of non magnetizable material in order to prevent its being inductively heated by the stray field of the inductor head. Preferably, brass, aluminum or special steel is used, unless electrically insulating material must be employed, or unless copper is to be recommended as a material of especially high electrical conductivity, for example for the conductor 6 of the inductor loop 5.

For the exact alignment of the inductor head 3 within the cylinder liner 2, the aligning device is designed as a spreadable hollow cage equipped on the outside with clamping shells 8, which can be applied free from play and under the effect of force against the inner surface of the cylinder liner 2. (Instead of the semi-cylindrical clamping shells 8 shown in the exemplary embodiment, it is also possible to attach radially displaceable clamping bars or clamping bosses to the outer circumference of the cage like aligning device and jointly displace them radially by means of a suitable mechanism. This will be discussed once again further below.) The two semi-cylindrical clamping shells 8 are connected to one another in an articulated manner via a hinge 9 along a generatrix; in the region of the opposite generatrix, the two clamping shells butt flush against one another with some distance between them. In this region, within the two clamping shells 8 there are at an axial distance from one another two actuating cylinders 10, which can be subjected to fluidic energy from an externally arranged pressure source. By means of the two actuating cylinders 10 which can be subjected to pressure on both sides, the two clamping shells 8 can be spread radially outwards and, under the effect of force, applied free from play against the inner surface of the cylinder liner 2 or be lifted radially inwards. As a result of the eccentric arrangement of the actuating cylinders 10 and the external arrangement of the hinge 9, the aligning device is kept in the center without any installation, so that there is sufficient space for accommodating the inductor loops 5 and their mounting. Although the drawings show only one inductor loop with its mounting and current feed, an inductor head with a double arrangement of inductor loops is also possible; the second inductor loop and its mounting being mirror-symmetrically opposite.

In principle, according to the invention, the inductor loops are mounted movably within the aligning device in such a way that, when the clamping shells 8 are applied, the inductor loops too are displaced in a locationally defined manner into the working position against the inner surface of the cylinder liner 2. This can be carried out, on the one hand, by radially guiding the inductor loops and their mounting separately from the clamping shells 8 or clamping bars. In the exemplary embodiment illustrated, however, the inductor loop is assigned immovably to the clamping shells 8, so that the inductor loop 5 is moved as a unit with the clamping shells 8.

The conductor 6 of the inductor loops 5 is a round tube made of copper. Specifically, the round tube is bent to form the essentially hairpin-shaped inductor loop 5. The interior of the conductor 6 can be subjected to cooling water and the lost heat thus dissipated quickly. In the working region of the inductor loop 5, that is to say in the region in which the conductors are at a uniform short distance from the inner surface of the cylinder liner 2, the conductors 6 are designed with an diameter corresponding to the desired strip width of the strip to be hardened. To make it possible to have only relatively low current losses in those parts of the conductor located outside the working region, larger lead cross-sections, especially in the region of the current feed leads 14, are provided there. These current feed leads are movable to the extent of the radial displacement of the inductor loop and this can be achieved, for example, by means of a certain inherent elasticity of the current feed leads and a rigid mounting of the inductor loop 5 within the clamping shell 8.

So that the inductor loops can be mounted in a dimensionally stable and accurately positioned manner, for each inductor loop there is a block 11 which consists of an electrically insulating material, and in which the conductor of the inductor loop is embedded positively and fastened therein. The material for the block 11 can be, for example, so-called green glass, which is a workshop term for a heat-resistant transparent glass-like plastic machinable by cutting. Milled or drilled on this block 11 according to the path of the conductors 6 are dimensionally appropriate channels, in which the inductor loop can then be embedded. An adhesive or sealing compound can be used for fastening the inductor loop 5 within the grooves of the block 11. A lateral clamping by suitable wedge-shaped battens and/or by means of screws is also possible.

So that the relative depth of penetration of the inductor head into the cylinder liner 2 and therefore the axial position of the region 7 to be hardened in relation to the cylinder liner 2 can be defined exactly, attached to one of the two clamping shells 8 is a collar 13, which itself carries a spacer ring 15 completely surrounding the inductor head 3. This exchangeable spacer ring 15 possesses, on its lower face confronting the cylinder liner 2, an axis-perpendicular stop face 16, which interacts mechanically with a corresponding, likewise axis-perpendicular end face in the upper end region of the cylinder liner 2. The axial position of the region 7 to be hardened in relation to the cylinder liner 2 can be determined by means of the height of the spacer ring 15.

Figure 1:
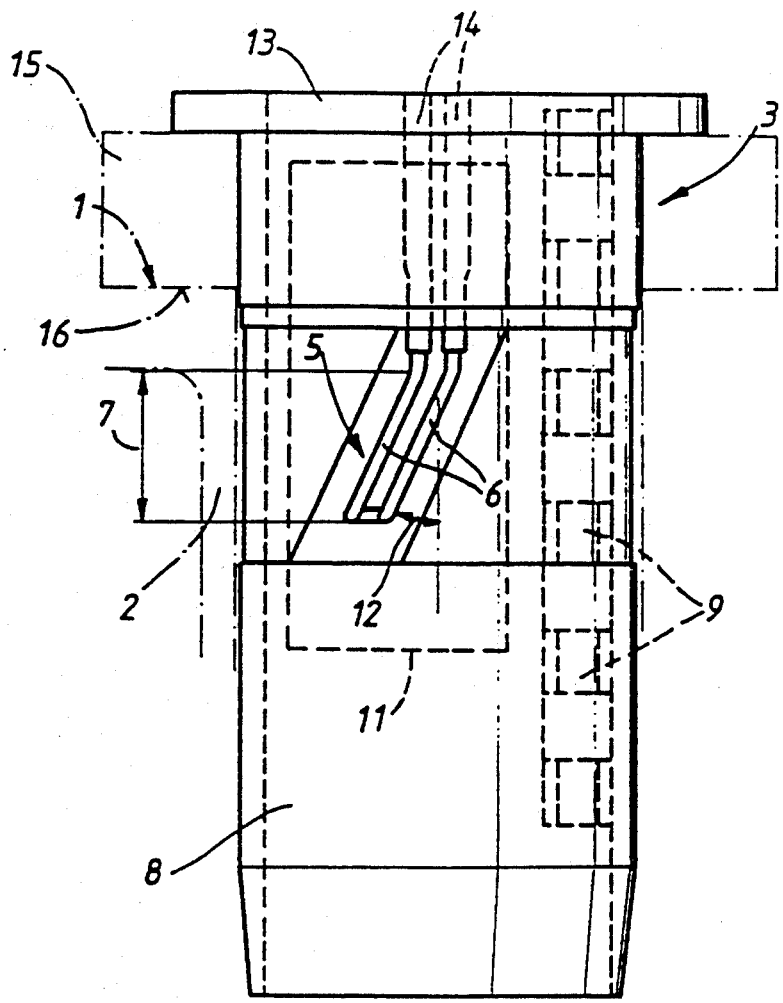
FIG. 1 shows a side view of an inductor head according to the invention.
Figure 2:
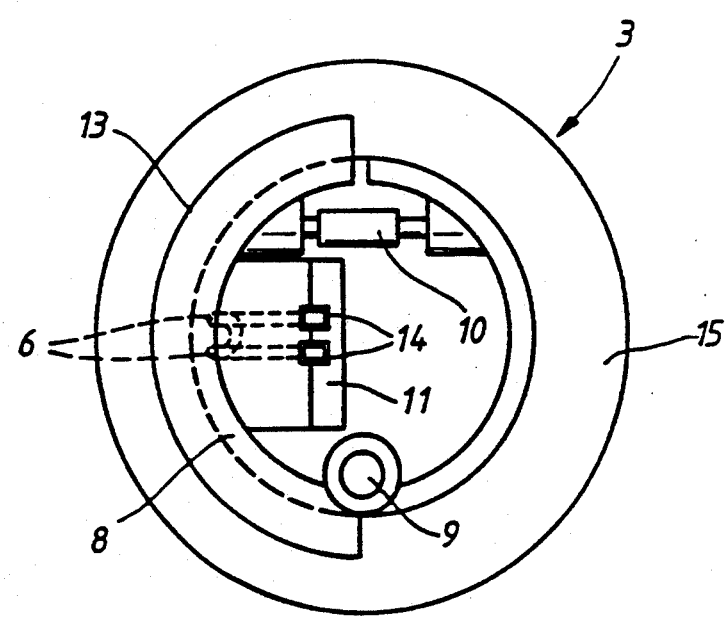
FIG. 2 shows an axial view of the inductor head according to FIG. 1, having a different arrangement of the inductor loops.

When the inductor head is in operation, only the region of the inner surface of the cylinder liner 2 located directly opposite the conductor 6 of the inductor loop is heated marginally. The short lower connecting web between the two conductors 6 causes no appreciable heating because, here, the conductor is laid at a greater distance from the inner surface of the cylinder liner. Heating therefore takes place essentially only in the conductors extending at least approximately in a straight line. Slight curves of the conductors 6 can nevertheless also be permitted. Consequently, not only those designs of the inductor loops in which the conductors 6 extend parallel to the generatrices come into consideration but, as shown in the exemplary embodiment according to FIG. 1, also those in which the conductors extend at an inclination—angle of inclination 12—relative to the generatrices of the inner surface of the cylinder liner. Thus, although the conductors 6 extend in a straight line in a developed view of the cylinder, they nevertheless have a curved path when seen tangentially, transversely relative to the conductor 6. However, as mentioned, this slight curvature has no adverse effect on an inductive power transmission at a high energy density. It is also quite possible for the individual conductors 6 to have a curved path in a developed view of the cylinder. Different strip patterns of this kind are known in various forms both with respect to the size of the angle of inclination 12 and with respect to any curvature, even though they are produced by other hardening processes, for example laster hardening.

In a multiple arrangement of inductor loops 5 within an inductor head, they will be mounted distributed on the circumference of the inductor head in axial positions approximately identical to one another and, in relation to the direction of the generatrices, in approximately identical angular positions. With a multiple arrangement of inductor loops on the circumference, the hardening of a cylinder liner can be concluded more quickly, because correspondingly less circumference has to be hardened by each inductor loop.

The operating mode of the hardening device is ensured by means of a control which is assigned to it and according to which the inductor loop 5 is subjected electrically to a high-frequency current only when the inductor head 3 is at a standstill relative to the cylinder liner 2. By virtue of the control, a pivoting of the inductor head 3 relative to the cylinder liner 2 is possible only when the inductor loops 5 are cut off electrically. This operating mode prevents a heating or hardening during the movement of the inductor head. It is the intention to aim for a stepped and intermittent heating during the standstill and a subsequent further indexed movement. The hardening carried out only at a relative standstill, with clamping shells applied free from play and under the effect of force and inductor loops brought into the working position, ensures that the once predetermined and set working distance of the conductors 6 of the inductor loops is accurately maintained and replicated in all the heating operations. A defined heating and self-quenching hardening restricted to a very thin boundary zone, and therefore a distortion-free hardening, are possible as a result. Moreover, the intermittent working and the laying of individual hard strips at a distance from one another also contribute to the distortion-free hardening. The hardening-device control causing this operating mode is appropriately so designed that a pivoting of the inductor head 3 relative to the cylinder liner 2 is functionally locked as long as the clamping shells are not lifted off and as long as the inductor loops 5 are not cut off electrically. Conversely, an electrical cut-in of the inductor loops 5 is appropriately functionally prevented as long as firstly a further indexed movement in the circumferential direction and thereafter a renewed application of the clamping shells 8 are not signalled.

So that a marginal heating and a self-quenching by the nonheated basic material lying underneath can be obtained, the boundary zone must be heated to a certain extent in a shock-like manner in a relatively thin region of a maximum of approximately 1.5 mm at a relative high energy density and very quickly (for example even within one second). In this manner, a very steep temperature gradient relative to the non-heated lower-lying basic material is established locally and temporarily. The heating to sufficiently high temperatures into the transformation range must have taken place in approximately one second. The higher the energy density, the more quickly the heating can take place. Specifically, energy densities in the range of more than 5 kW/cm$^2$ are advantageous. A heating time greater than approximately 1.5 seconds is not appropriate because a relatively flat temperature gradient within the workpiece can already form in this time, and thus a rapid self-quenching by the lower-lying basic material is no longer assured.

So that only the boundary zones of the cylinder line near the surface can be heated inductively to a sufficient extent with the inductor loop at energy densities in the range of approximately 10 kW/cm$^2$, the high-frequency current must have a frequency above 100 kHz, preferably above 300 kHz. Trial hardenings have been carried out at a frequency of between 400 and 500 kHz. With alternating currents of such high frequency, the above mentioned energy densities can be transmitted inductively during heating and very rapid heating achieved in thin boundary layers. The desired very steep temperature gradient occurring at the transition to the non-heated lower-lying basic material and necessary for a self-quenching of the heated boundary zone is also established thereby.

In conclusion, possible alternative forms of the aligning device of the inductor head will also be discussed briefly. Specifically, it is possible for the aligning device to be designed in the form of a cylindrical cage in which the cage bars extend parallel to the generatrices, are mounted and guided radially displaceably and can all be driven synchronously. For example, such a possibility of synchronous displacement can be afforded if all the radially displaceable clamping bars are respectively coupled to a separate parallel eccentric shaft, which can themselves all be rotated jointly via an annular gearwheel, in unison and to a uniform extent. It is also conceivable for such clamping bars arranged in a cage-like manner to be adjusted radially via axially displaceable pairs of cone surfaces in a similar way to the honing stone holders on a honing tool. Instead of continuous clamping battens, it is also possible to keep these relatively short or to keep at least the contact faces with the inner surface of the cylinder liner relatively short, so that, in principle, they can then only be referred to as clamping bosses. A wide range of construction possibilities is open in this respect.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Apparatus for inductive heating of an interior surface region on a cylinder liner for a reciprocating piston engine to a transformation temperature for hardening said interior surface region, said apparatus comprising:

an inductor head which is axially and rotatably displaceable relative to said cylinder liner, and which has at least one electrically conductive inductor loop which extends over an entire axial dimension of said interior surface region and over a small fraction of said interior surface region in a circumferential direction, said inductor loop being rigidly disposed in an electrically insulative, dimensionally stable mounting;

nonmagnetic alignment means for aligning said inductor head relative to said interior surface region of said cylinder liner, said alignment means comprising a spreadable cage which is open in a center portion thereof and which has at least two clamping parts arranged at a periphery thereof, said clamping parts being movable between a first position in which they are pressed immovably against an interior surface of said cylinder liner, holding said alignment means in a fixed position relative thereto, and a second position in which said clamping parts are withdrawn from contact with said interior surface, permitting said alignment means is to be displaced relative to said interior surface of said cylinder liner;

said inductor head being mounted to said alignment means in a fixed position relative to, and movable with, one of said at least two clamping parts, whereby when said clamping parts are in said first position, said inductor loop is held in a working position wherein said inductor loop is disposed at a fixed uniform radial distance from, and in close proximity to, said interior surface region of said cylinder liner, at a fixed axial and circumferential position relative thereto, and when said clamping parts are in said second position said inductor loop is moved away from said interior surface region;

a servo mechanism operatively coupled to said clamping parts and operable to move said clamping parts between said first and second positions;

a high frequency current source;

control means for coupling said high frequency current source to supply a high frequency current to said inductor loop when said clamping parts are in said first position, and for interrupting said high frequency current when said clamping parts are in said second position;

means for rotating said inductor head relative to said cylinder liner when said clamping parts are in said second position.

2. Apparatus according to claim 1, wherein: said inductor loop is disposed at a distance of approximately 1.5 mm from said interior surface region of said cylinder liner when said inductor head is in said working position, whereby said interior surface region adjacent said inductor loop is heated to a transformation temperature in approximately one second, with a portion of said cylinder liner underlying said interior surface region adjacent said inductor loop remaining cooler than said interior surface region, a temperature gradient being established between said surface region and said portion of said cylinder liner whereby heat is conducted away from said interior surface region.

3. Apparatus according to claim 1, wherein said clamping parts are clamping bars.

4. Apparatus according to claim 1, wherein said clamping parts are clamping bosses.

5. Apparatus according to claim 1, wherein said clamping parts are clamping shells.

6. Apparatus according to claim 1, wherein said at least one inductor loop is embedded positively in a block of electrically insulating material and is fastened therein.

7. Apparatus according to claim 3, wherein said at least one inductor loop is embedded positively in a block of electrically insulating material and is fastened therein.

8. Apparatus according to claim 1, wherein said at least one inductor loop extends at an inclination relative to generatrices of said interior surface of said cylinder liner.

9. Apparatus according to claim 6, wherein the conductor of said at least one inductor loop extends at an inclination relative to generatrices of said interior surface of said cylinder liner.

10. Apparatus according to claim 1, wherein said at least one inductor loop comprises four inductor loops of identical shape. distributed equiangularly on a circumference of the inductor head.

11. Apparatus according to claim 8, wherein said at least one inductor loop comprises four inductor loops of identical shape, distributed equiangularly on a circumference of the inductor head.

12. Apparatus according to claim 1, wherein said inductor head further comprises an axis-perpendicular stop face defining a relative depth of penetration of said inductor head into the cylinder liner.

13. Apparatus according to claim 10, wherein said inductor head further comprises an axi-perpendicular stop face defining a relative depth of penetration of said inductor head into the cylinder liner.

14. Apparatus according to claim 1, wherein said inductor loop provides energy to said interior surface region at a power density at least approximately 5 kW/cm$^2$ when high frequency current is supplied to said inductor loop.

15. Apparatus according to claim 1, wherein frequency of the high-frequency current is high than 300 kHz.

16. Apparatus according to claim 15, wherein the frequency of the high-frequency current is approximately 400–500 kHz.

* * * * *